March 9, 1954 R. B. MATTHEWS 2,671,863
ELECTROMAGNETIC CONTROL DEVICE
Filed Jan. 24, 1951 3 Sheets-Sheet 1

INVENTOR.
Russell B. Matthews
BY

March 9, 1954 R. B. MATTHEWS 2,671,863
ELECTROMAGNETIC CONTROL DEVICE
Filed Jan. 24, 1951 3 Sheets-Sheet 3
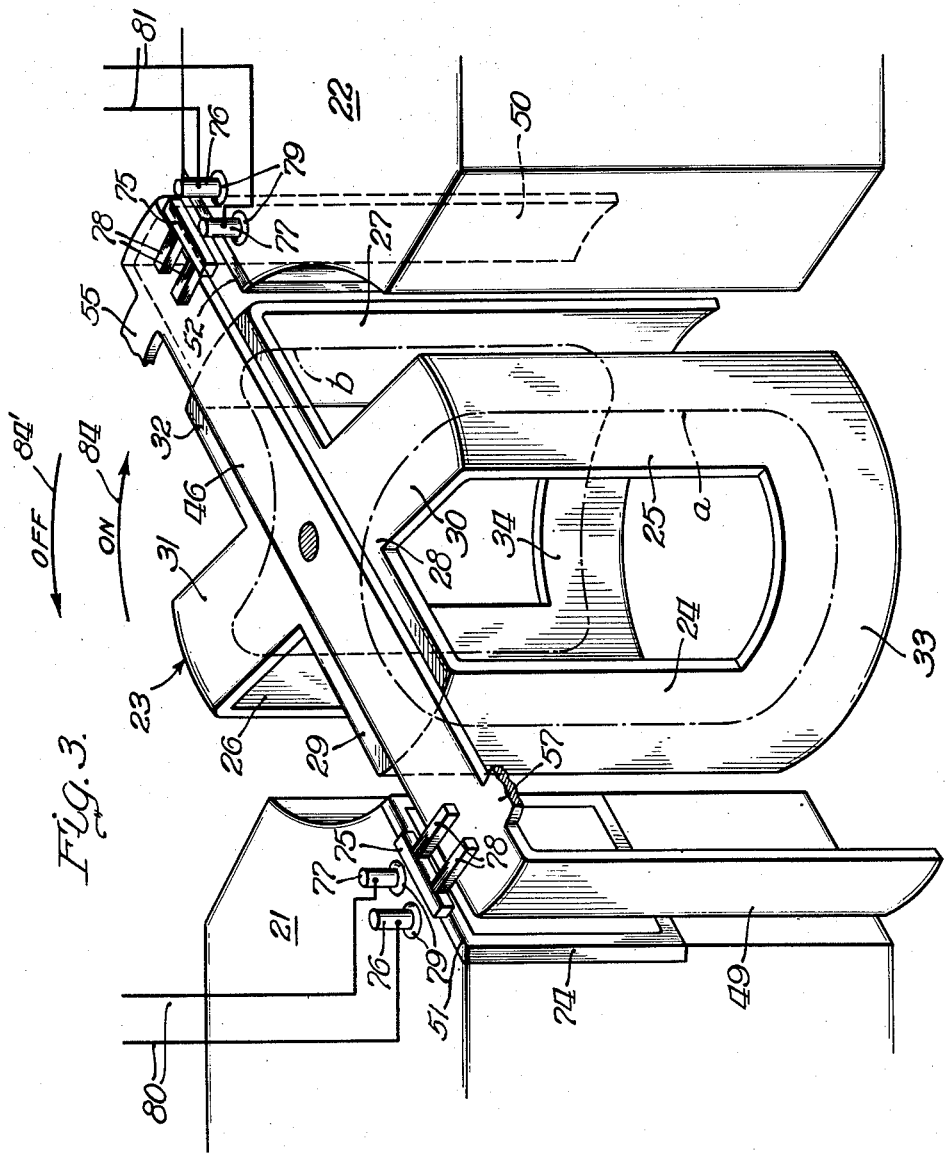
INVENTOR.
Russell B. Matthews
BY Patented Mar. 9, 1954

2,671,863

UNITED STATES PATENT OFFICE 2,671,863

ELECTROMAGNETIC CONTROL DEVICE

Russell B. Matthews, Wauwatosa, Wis., assignor to Milwaukee Gas Specialty Company, Milwaukee, Wis., a corporation of Wisconsin Application January 24, 1951, Serial No. 207,570

14 Claims. (Cl. 310—36)

This invention relates, in general, to control devices, and has particular relation to an improved electromagnetic control device.

While the particular device which I shall describe hereinafter in connection with the drawings is adapted for use for controlling a valve or the like for, in turn, controlling a heater or a cooling device or the like, and for making, breaking or changing the connections in one or more electric circuits, it is to be understood that the device may be used only for making, breaking or changing the connections in one or more electric circuits, or only for controlling a valve, or for controlling other devices as suitable or desired.

The present invention may be more particularly characterized as relating to devices of the character disclosed and claimed in the copending application of Gifford I. Holmes and Russell B. Matthews, Serial No. 180,482, filed August 19, 1950, and in my copending application, Serial No. 184,755, filed September 14, 1950.

One of the main objects of the present invention is to provide an improved control device wherein the initial operating force which is obtained is a maximum, as distinguished from devices in which the force exerted initially is a minimum. This is advantageous in that it provides a large initial or starting force for overcoming the inertia and friction of moving parts, and a strong initial force which, for example, will overcome fluid pressures, for example, for opening a valve wherein the controlled fluid—such as gas for a gas heater—usually tends to hold the valve closed, or which will, for example, overcome the initial inertia and friction in separating a circuit controlling member from the cooperating contact means with which it engages when in closed position.

Another object of the invention is to provide an improved device in which the maximum initial operating force is obtained by electric induction.

Another object of the invention is to provide a device in which the operating force is obtained through part of the operation by electric induction, and through another part of the operation by magnetic attraction; more particularly, a device in which the initial operating force is obtained by electric induction and wherein thereafter magnetic attraction is brought into use in completing the operation of the device. This assures not only a powerful or maximum initial operating force, but also greater force after initial operation than would be obtained solely by electric induction.

Another object of the invention is to provide a device of simple, compact, and relatively inexpensive construction which will lend itself for controlling one or more switches, a valve, a combination of valve and one or more switches, or other controlling devices, for example, by a thermostat or other condition responsive device.

Another object of the invention is to provide a device of the class described in which there is a rotor mounted for rotation between pole pieces of the core, and to which rotation is imparted to actuate the one or more controlled devices.

Another object of the invention is to provide a device in which not only is there a rotor mounted for rotation between pole pieces of the core, but a magnetic armature carried by the rotor and having arms which are moved by rotation of the rotor by electric induction into position to be magnetically attracted to the pole pieces of the core subsequent to initial rotation of the rotor.

Another object of the invention is to provide a device which is immune to the influence of gravity and may, therefore, be used in any desired position.

Another object of the invention is to provide an improved device of the class described in which the rotor is held magnetically in one position and in which the rotor will not be unintentionally released or moved from such position.

Further objects and advantages of the invention will appear from the following detailed description, taken in connection with the accompanying drawings.

In the drawings:

Figure 3 is a perspective view of the rotor and magnetic armature in assembled relation; and Figure 4 is a fragmentary detail view showing the connection between the rotating actuator and the valve member.

Figure 1:
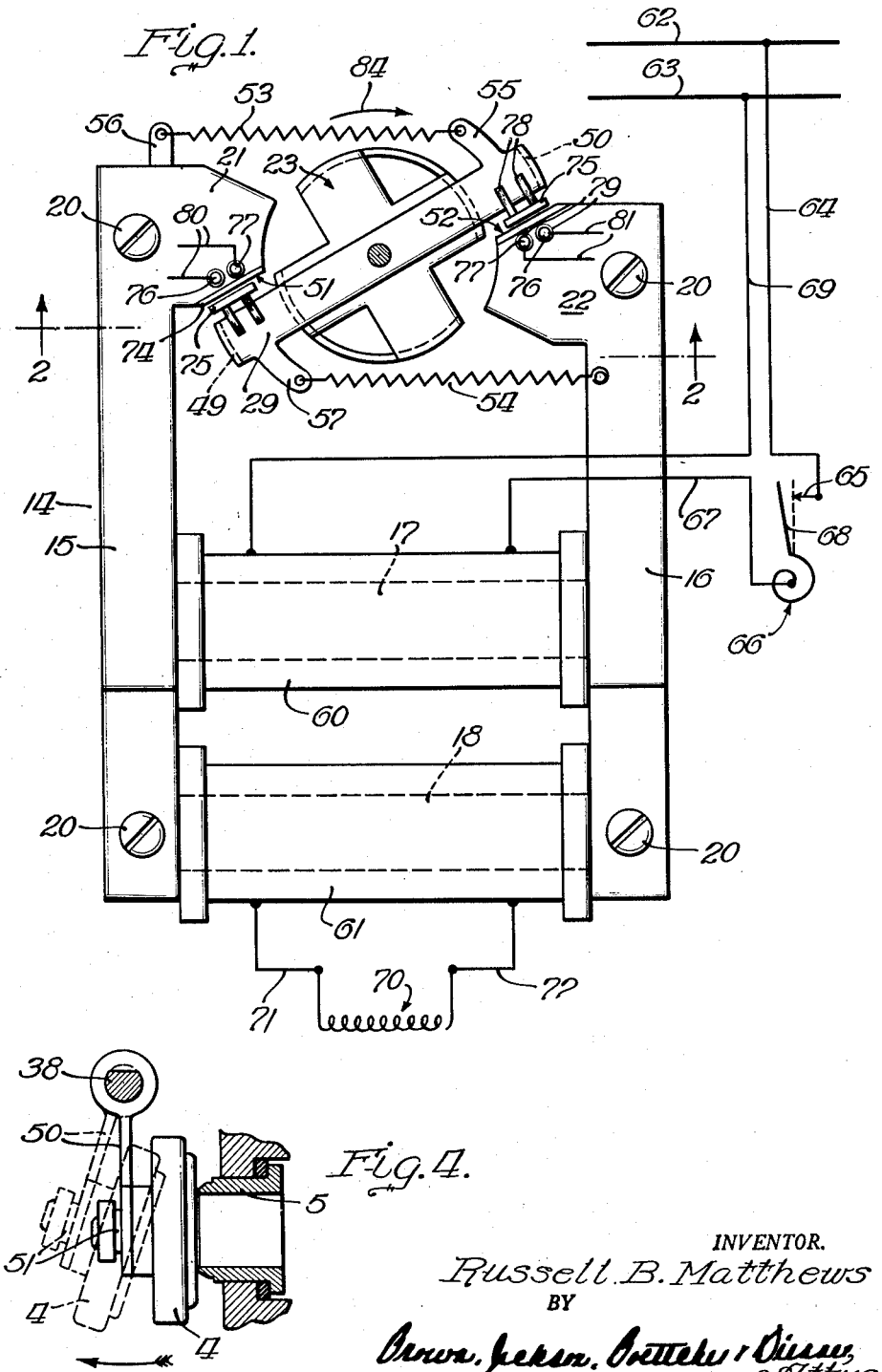
Figure 1 is a more or less diagrammatic plan view of one form of device embodying the present invention.

Referring now to the drawings, the particular embodiment of the invention selected for illustration comprises a valve body 1 having a fluid inlet 2 and a fluid outlet 3. A valve member 4 cooperates with a valve seat 5 at the outlet 3 to control the flow of fluid through the valve, for example, the flow of gaseous fuel to a burner (not shown) or any other fluid. It will be noted that the controlled fluid tends to hold the valve member 4 closed. This may, of course, vary within the scope of the present invention.

The valve body 1 has an opening 6 covered by a plate 7 which is secured in place over the opening 6, for example, by screws (not shown). Sealing means 9 is preferably interposed between the plate 7 and valve body 1. The plate 7 is preferably formed of high specific resistance non-magnetic material, such as stainless steel.

A post 10 formed of non-magnetic material, such as that previously mentioned, is screwed at 11 into the plate 7. This post 10 has an enlarged head 12 between which and plate 7 there may be a washer or seal 13.

The magnetic core 14 is of laminated form as shown. The particular core 14 selected for illustration has parallel side legs 15 and 16 magnetically connected by parallel legs 17 and 18. The core 14 is seated upon and secured to bosses 19 integral with the plate 7 by screws 20. The side legs 15 and 16 of the core 14 near their free ends have spaced pole pieces 21 and 22 formed, for example, as integral parts of the core laminations. A rotor 23 is mounted for rotation about the post 10 in position between the pole pieces 21 and 22.

The rotor 23 is formed of non-magnetic and good electric conducting material, and has two pairs of conductive side legs 24 and 25, and 26 and 27, which are shown arranged in an annular path. A generally cross-shaped integral conductive end member 28 has radial legs 29 and 30 conductively connecting side legs 24 and 25, and radial legs 31 and 32 conductively connecting the side legs 26 and 27 at one end of the rotor. The legs 24, 25 are conductively connected at the opposite end of the rotor by an integral arcuate conducting portion 33, and the legs 26, 27 are conductively connected by a corresponding integral arcuate conducting portion 34.

Instead of being cross-shaped, the end of the rotor 23 opposite the end at which arcuate conducting portions 33 and 34 are disposed may be of circular or other suitable form.

The structure described forms in the rotor a pair of looped conducting paths indicated by dot-and-dash lines a and b. These conducting paths are shown in parallel circuit relation, but they may, within the scope of the present invention, be in series circuit relation as shown and described in my copending application Serial No. 184,755, filed September 14, 1950.

Figure 2:
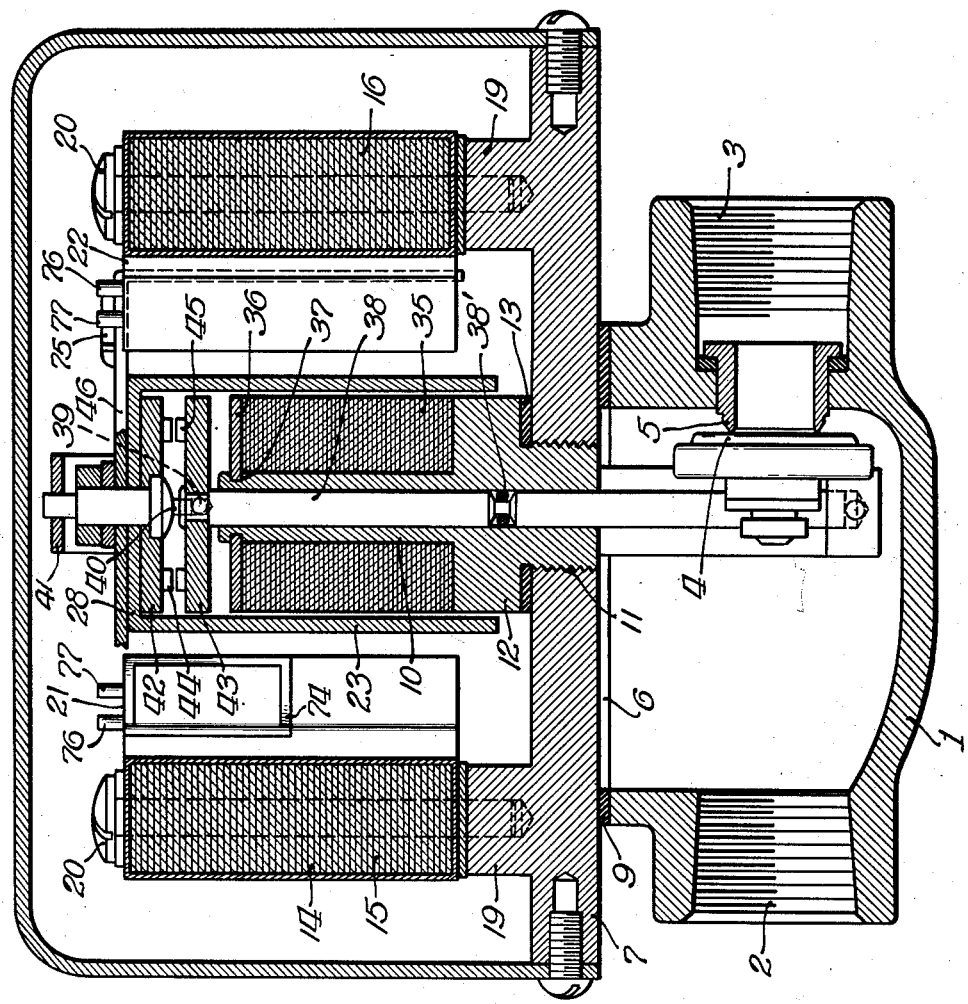
Figure 2 is a sectional view taken axially through the rotor of the device, substantially along the line 2—2 of Figure 1.

A stationary magnetic core 35, which is circular and of laminated or other suitable form, may be fixedly secured on the post 10 and within rotor 23, for example, between the head 12 and a disc 36 fixed at 37 on the upper end of the post as the device is shown in Figure 2.

An actuator rod 38 extends axially through an opening in post 10, and has rotation therein. An annular or O-shaped ring 38' of neoprene or material which is resistant to gaseous hydrocarbons forms a gas seal between rod 38 and the inner periphery of the opening in the post 10. The upper end of the rod 38 has a socket in which is mounted a ball-bearing 39. A coaxial pin 40 has a lower reduced end supported on bearing 39, and an upper reduced end journaled in a retaining fork 41.

For the purpose of imparting rotation to the rod 38 from the rotor 23 which constitutes the prime mover, cooperating actuating means is provided on the rotor 23 and on the rod 38. The particular actuating coupling selected for illustration comprises a disc 42 fixed to turn with the rotor 23, and a disc 43 fixed to turn with the rod 38. These discs are preferably formed of high specific resistance, non-magnetic metal—such as stainless steel—and have cooperating clutch claws 44 and 45. The claws 44 and 45 are preferably arranged to permit initial rotation of rotor 23 free of the actuating rod 38, followed by engagement of claws 44 with claws 45, whereupon the rod 38 is picked up with an impact and turns with the rotor 23.

The rotor 23 carries a magnetic armature 46. The particular armature selected for illustration is of generally U-shaped form with the base of the U secured to the adjacent end of the rotor 23 so that the armature 46 will turn with the rotor. The armature legs 49 and 50 straddle the rotor and cooperate with oblique faces 51 and 52 respectively of the pole pieces 21 and 22, as will presently appear.

The rotor 23 is retained in the position which it assumes in the absence of actuating magnetic flux between the pole pieces 21 and 22, and returned to that position when the device is de-energized, for example, by a pair of coiled springs 53 and 54. Spring 53 is connected between a lug 55 on armature arm 50, and an extending lug 56 on core leg 15. The other spring 54 is connected between a lug 57 on armature arm 49 and the other core leg 16.

An alternating current primary winding 60 is wound around the magnetic core leg 17, and a secondary winding 61 is wound around the magnetic core leg 18. It is to be understood that either winding may be the primary winding, and either winding may be the secondary winding. The electric power for energizing the winding 60 is supplied, for example, from line conductors 62 and 63 leading from a suitable source of alternating current, such as a household current supply line of the type which averages about 115 volts.

The line conductor 62 is connected by a conductor 64 with a fixed contact 65, for example, of a thermostat 66. A conductor 67 connects the other terminal 68 of the thermostat 66 with one end of the primary winding 60. The other end of the primary winding is connected by a conductor 69 to the other line conductor 63. The thermostat 66 may be positioned, for example, in a room or other space, or it may be placed where it will be subject to the temperature of a heater or otherwise disposed as desired. It is also contemplated that the device 66, instead of being a temperature responsive thermostat, may be any other condition responsive means or other device for opening and closing the circuit of the primary winding 60 as and when suitable or desired.

A glow coil 70 in the form of a coiled wire or other suitable ignition element is shown connected at its ends to the ends of the secondary winding 61 by conductors 71 and 72. The ignition element 70 may be disposed in position to ignite a gaseous fuel burner when the device is energized, as will presently appear. The ignition means may be omitted within the scope of the present invention, and where it is present it may vary widely.

In the illustrated embodiment of the invention, each of the pole faces of the pole pieces 21 and 22 has a copper shading ring 74 which functions to retain the armature 46 in attracted position and against release or dropping away from the pole faces. Each of the opposite ends of the base of the armature 46 carries a bridging contact 75 for bridging or connecting adjacent contacts 76 and 77 when the armature 46 is in attracted position cooperating with the pole faces of the pole pieces 21 and 22. The bridging contacts 75 are shown carried by insulating supports 78 which, in turn, are carried by the armature 46. The contacts 76 and 77 are shown carried by the pole pieces 21 and 22 and insulated therefrom by insulation designated at 79. This may, of course, vary.

When the rotor 23 and magnetic armature 46 are in retracted position, the bridging contacts 75 are out of contact with their contacts 76 and 77, and the circuits for these contacts are broken or open. These circuits are shown fragmentarily at 80 and 81 in Figure 1, and they may be used for controlling any suitable or preferred devices, such as devices forming part of a control system for a heater or cooling device.

In the operation of the device, when the temperature to which the thermostat 66 is responsive decreases, the thermostat closes the contact 68 into engagement with the contact 65. This closes the circuit of the primary winding 60 and magnetic flux is induced in the core 14. This flux passes through the core legs 17 and 18; also in a direction across the pole pieces 21 and 22.

Since the rotor 23 presents, in effect, a pair of closed conductor loops 24, 33, 25, 30, and 29, and 27, 34, 26, 31, and 32, of good conductivity, there is induced in these loops alternating current of opposite polarity to that impressed upon the winding 60. This current flows through the looped paths shown by the dot-and-dash lines $a$ and $b$ in Figure 3. This current induces an alternating flux the polarity of which opposes the polarity of the flux established across the pole pieces 21 and 22 by the winding 60 when the circuit for this winding is closed, for example, by the thermostat 66. As a result, the rotor 23 is rotated, for example, from its retracted position toward its attracted position in the direction indicated by the arrow 84 in Figures 1 and 3. The initial operating force is imparted to the rotor 23 by repulsion, and hence this initial force is a maximum.

Where the initial rotation of the rotor 23 on the bearing 39 is free of the actuator rod 38, this initial free turning of the rotor is followed by engagement of clutch claws 44 with clutch claws 45. As a result, the actuator rod 38 is picked up with relatively heavy impact and the actuator rod 38 then turns with the rotor 23. This turning movement of the rod 38 is imparted to the actuated device, which, in the case of a valve as shown in the drawings, is preferably opened by such turning movement to take advantage of the powerful initial operating force. As a result of this powerful force, the valve 4 or other controlled device may be relatively large and heavy, yet operated to open position with a small, compact operator.

As the rotor 23 is rotated in the direction of the arrow 84 by electric induction, the armature arms 49 and 50 come within the magnetic influence of the pole pieces 21 and 22, and, as a result, turning force is thereafter imparted by magnetic attraction to complete rotation of the rotor 23 in the direction of the arrow 84. In this way initial operating force is obtained by electric conduction, and thereafter magnetic attraction is brought into use in completing the operation of the device.

Where the armature 46 carries bridging contacts 75, these bridging contacts engage and connect contacts 76 and 77 at the limit of turning movement of rotor 23 in the direction of the arrow 84. The circuits 80 and 81, controlled by the contacts 75, 76 and 77, are thus closed for controlling any suitable or preferred devices, such as devices forming part of a control system for a heater or cooling device or the like.

When the thermostat 66 disengages contact 68 from contact 65, the winding 60 is deenergized and the magnetic flux established by this winding ceases. Hence the springs 53 and 54 will cause the rotor 23 and armature 46 to rotate in the opposite direction, as indicated by the arrow 84' in Figure 3, with an attendant movement of the actuated device 4 in the opposite direction, for example, in the case of a valve as shown in the drawings, to a closed position. This rotation of rotor 23 and armature 46 in the opposite direction under the action of springs 53 and 54 also separates contacts 75 from contacts 76 and 77, to break or open the electric circuits 80 and 81 controlled by these contacts.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. An electromagnetic operator comprising a magnetically permeable frame having spaced pole pieces between which magnetic flux is adapted to flow, magnetic field producing means on said frame, a non-magnetic and electric conducting rotor mounted for turning movement between said pole pieces from a first position to a second position and inductively coupled with said magnetic field producing means to be turned by repulsion from said first position with a relatively large initial operating force which diminishes after initial turning movement of the rotor from said first position, and magnetic armature means carried by said rotor and movable with said turning movement of said rotor into coacting relation with said pole pieces as said rotor approaches said second position for actuating said rotor to its said second position by magnetic attraction between said pole pieces and said armature.

2. An electromagnetic operator according to claim 1 wherein the pole pieces of the magnetic frame having opposing pole faces between which the rotor is mounted for turning movement and oblique faces disposed in the path of turning movement of said magnetic armature.

3. An electromagnetic operator according to claim 1 wherein the pole pieces of the magnetic frame having opposing pole faces between which the rotor is mounted for turning movement and oblique faces disposed in the path of turning movement of said magnetic armature, and shading means on said oblique faces and coacting with said armature to retain said armature attracted to said oblique faces and against moving away from said faces during the presence of actuating magnetic flux between said pole pieces.

4. An electromagnetic operator according to claim 1 wherein the rotor has at least two pairs of non-magnetic and electric conducting legs arranged in an annular path and extending generally parallel with the axis of the rotor, and non-magnetic and electric conducting connections between said legs and forming therewith at least two current conducting paths each of closed circuit and looped form.

5. An electromagnetic operator according to claim 1 wherein the rotor has at least two pairs of non-magnetic and electric conducting legs arranged in an annular path and extending generally parallel with the axis of the rotor, and non-magnetic and electric conducting connections between said legs and forming therewith at least two current conducting paths each of closed circuit and looped form, said magnetic armature having armature arms carried by one end of said rotor and projecting in diametrically opposite directions therefrom, the outer ends of said arms having magnetic armature portions disposed substantially parallel with the axis of said rotor.

6. An electromagnetic operator according to claim 1 wherein there is means biasing said rotor to its said first position in the absence of actuating magnetic flux between said pole pieces.

7. An electromagnetic operator comprising a magnetically permeable frame having spaced pole pieces between which magnetic flux is adapted to flow, magnetic field producing means on said frame, a non-magnetic and electric conducting rotor mounted for turning movement between said pole pieces from a first position to a second position and inductively coupled with said magnetic field producing means to be turned by repulsion from said first position with a relatively large initial operating force which diminishes after initial turning movement of the rotor from said first position, magnetic armature means carried by said rotor and movable with said turning movement of said rotor into coacting relation with said pole pieces as said rotor approaches said second position for actuating said rotor to its second position by magnetic attraction between said pole pieces and said armature, an actuator mounted for turning movement about an axis coaxial with said rotor, a controlling member having a first position and movable to a second position by turning movement of said actuator, and coupling means permitting initial rotation of said rotor from its first position free of said actuator and effective after said initial turning movement of said rotor to turn said actuator therewith in the rotation of said rotor to its second position.

8. An electromagnetic operator according to claim 7 wherein said controlling member comprises a valve member having an open position and a closed position and operable from one of said positions to its other position by the turning movement of said rotor to its said second position.

9. An electromagnetic operator according to claim 7 wherein said controlling member comprises a valve member having an open position and a closed position and operable from one of said positions to its other position by the turning movement of said rotor to its said second position and means biasing said rotor to its said first position and said valve member to one of its said positions in the absence of actuating magnetic flux between said pole pieces.

10. An electromagnetic operator comprising a magnetically permeable frame having spaced pole pieces between which magnetic flux is adapted to flow, magnetic field producing means on said frame, a non-magnetic and electric conducting rotor mounted for turning movement between said pole pieces from a first position to a second position and inductively coupled with said magnetic field producing means to be turned by repulsion from said first position with a relatively large initial operating force which diminishes after initial turning movement of the rotor from said first position, magnetic armature means carried by said rotor and movable with said turning movement of said rotor into coacting relation with said pole pieces as said rotor approaches said second position for actuating said rotor to its said second position by magnetic attraction between said pole pieces and said armature, an actuator mounted for turning movement about an axis coaxial with said rotor, a valve member having an opening position and a closed position and operable from one of said positions to its other position by the turning movement of said rotor to its second position, means biasing said rotor to its said first position and said valve member to one of its said positions in the absence of actuating magnetic flux between said pole pieces, stationary contact means on said magnetically permeable frame, and movable contact means carried by said armature for movement into contact with said stationary contact means by rotation of said rotor to its said second position.

11. An electromagnetic operator according to claim 10 wherein said stationary contact means comprises at least two pairs of stationary contacts and said movable contact means comprises at least two bridging contacts one for each of said pairs of stationary contacts.

12. An electromagnetic operator comprising a magnetically permeable frame having spaced pole pieces between which magnetic flux is adapted to flow, a first winding on said magnetic frame for establishing magnetic flux therein, a non-magnetic and electric conducting rotor mounted for turning movement between said pole pieces from a first position to a second position and inductively coupled with said first winding to be turned by repulsion from said first position with a relatively large initial operating force which diminishes after initial turning movement of the rotor from said first position, magnetic armature means carried by said rotor and movable with said turning movement of said rotor into coacting relation with said pole pieces as said rotor approaches said second position for actuating said rotor to its said second position by magnetic attraction between said pole pieces and said armature, a second winding on said magnetic frame and inductively coupled to said first winding, and ignition means in circuit with said second winding and energized by energization of said first winding.

13. An electromagnetic operator comprising a magnetically permeable frame having spaced pole pieces between which magnetic flux is adapted to flow, magnetic field producing means on said frame, a non-magnetic and electric conducting rotor mounted for turning movement between said pole pieces from a first position to a second position and inductively coupled with said magnetic field producing means to be turned by repulsion from said first position with a relatively large initial operating force which diminishes after initial turning movement of the rotor from said first position, magnetic armature means carried by said rotor and movable with said turning movement of said rotor into coacting relation with said pole pieces as said rotor approaches said second position for actuating said rotor to its second position by magnetic attraction between said pole pieces and said armature, an actuator mounted for turning movement about an axis coaxial with said rotor, a controlling member having a first position and movable to a second position by turning movement of said actuator, and coupling means effective to turn said actuator with said rotor in the rotation of said rotor to its second position.

14. An electromagnetic operator comprising a magnetically permeable frame having spaced pole pieces between which magnetic flux is adapted to flow, magnetic field producing means on said frame, a non-magnetic and electric conducting rotor mounted for turning movement between said pole pieces from a first position to a second position and inductively coupled with said magnetic field producing means to be turned by repulsion from said first position with a relatively large initial operating force which diminishes after initial turning movement of the rotor from said first position, magnetic armature means carried by said rotor and movable with said turning movement of said rotor into coacting relation with said pole pieces as said rotor approaches said second position for actuating said rotor to its said second position by magnetic attraction between said pole pieces and said armature, an actuator mounted for turning movement about an axis coaxial with said rotor, a valve member having an open position and a closed position and operable from one of said positions to its other position by the turning movement of said rotor to its second position, means biasing said rotor to its said first position and said valve member to one of its said positions in the absence of actuating magnetic flux between said pole pieces, stationary contact means, and movable contact means actuated by said rotor into contact with said stationary contact means by rotation of said rotor to its said second position.

RUSSELL B. MATTHEWS.

References Cited in the file of this patent

UNITED STATES PATENTS

| Number | Name | Date |
|---|---|---|
| 363,186 | Thomson | May 17, 1887 |
| 428,650 | Thomson | May 27, 1890 |
| 1,503,085 | Blake | July 29, 1924 |
| 1,532,336 | Nottage et al. | Apr. 7, 1925 |
| 1,620,556 | Jones | Mar. 8, 1927 |
| 1,810,306 | Trofimov | June 16, 1931 |
| 1,858,876 | Bossart | May 17, 1932 |
| 1,880,524 | Taylor | Oct. 4, 1932 |
| 1,893,223 | Burkle | Jan. 3, 1933 |
| 1,915,050 | Coldwell | June 20, 1933 |
| 1,915,095 | Jump | June 20, 1933 |
| 2,052,987 | Persons | Sept. 1, 1936 |
| 2,380,164 | Goldsborough | July 10, 1945 |
| 2,455,049 | Edwards et al. | Nov. 30, 1948 |
| 2,458,123 | Wasserlein | Jan. 4, 1948 |
| 2,470,928 | Halter | May 24, 1949 |
| 2,484,934 | Debrey | Oct. 18, 1949 |
| 2,541,937 | Powers | Feb. 13, 1951 |

FOREIGN PATENTS

| Number | Country | Date |
|---|---|---|
| 452,598 | Great Britain | Aug. 26, 1936 |
| 619,580 | Great Britain | Aug. 19, 1943 |